United States Patent
Tsuboi

(10) Patent No.: US 7,315,405 B2
(45) Date of Patent: Jan. 1, 2008

(54) IMAGE FORMING APPARATUS AND IMAGE SCANNING METHOD

(75) Inventor: Yoshihito Tsuboi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 134 days.

(21) Appl. No.: 10/921,931

(22) Filed: Aug. 20, 2004

(65) Prior Publication Data

US 2005/0041269 A1    Feb. 24, 2005

(30) Foreign Application Priority Data

Aug. 20, 2003    (JP)    ............................. 2003-296477

(51) Int. Cl.
    *H04N 1/04*    (2006.01)
(52) U.S. Cl. ...................... 358/474; 358/509; 362/228
(58) Field of Classification Search ................. 362/228; 355/70; 358/474, 509
    See application file for complete search history.

(56) References Cited

U.S. PATENT DOCUMENTS 4,926,253 A * 5/1990 Nakashima et al. ........ 358/515

6,812,957 B1 * 11/2004 Chen ........................... 348/98
6,906,830 B1 * 6/2005 Hayashi ....................... 358/474
2002/0109866 A1 * 8/2002 Yang et al. ................. 358/474

FOREIGN PATENT DOCUMENTS

| JP | 9-330001 | 12/1997 |
|---|---|---|
| JP | 11-98331 | 4/1999 |
| JP | 2000-32219 | 1/2000 |
| JP | 2000-106617 | 4/2000 |
| JP | 2000-253284 | 9/2000 |
| JP | 2001-333254 | 11/2001 |
| JP | 2001-339577 | 12/2001 |

* cited by examiner

*Primary Examiner*—Sandra O'Shea
*Assistant Examiner*—James W. Cranson, Jr.
(74) *Attorney, Agent, or Firm*—Oblon, Spivak, McClelland, Maier & Neustadt, P.C.

(57) ABSTRACT

As a reading light source, a cold-cathode tube having three wavelengths and an LED array are used in combination. The cold-cathode tube and the LEDs are lit up at different timings when reading a document.

3 Claims, 5 Drawing Sheets

IMAGE FORMING APPARATUS AND IMAGE SCANNING METHOD

CROSS-REFERENCE TO RELATED APPLICATIONS

The present document incorporates by reference the entire contents of Japanese priority document, 2003-296477 filed in Japan on Aug. 20, 2003.

BACKGROUND OF THE INVENTION

1) Field of the Invention

The present invention relates to a scanning method employed in image forming apparatuses.

2) Description of the Related Art

Currently, full-color digital apparatuses are the mainstream among the image forming apparatuses. Such an image forming apparatus has a light source and a document surface is illuminated with a light of this light source. The light reflected from the surface of the document is detected with a sensor and sensed light is converted into an electric signal (optical-electrical conversion).

Japanese Patent Application Laid-Open Publication No. 2000-106617 discloses a conventional image forming apparatus. In this image forming apparatus, a fixed light-emitting element and a plurality of optical-electrical converting elements arranged in line as a line sensor are integrally configured on a transparent glass plate. An organic LED is adopted as a light source.

Japanese Patent Application Laid-Open Publication No. 2000-253284 discloses a conventional image reading apparatus. In this image reading apparatus, a document is illuminated with light from light-emitting units varied in wavelength. Lamps are used as a light source.

Japanese Patent Application Laid-Open Publication No. 2001-333254 discloses another image reading apparatus. In this image reading apparatus, an LED light source and a tube light source, such as a fluorescent tube, a cold-cathode tube, and a Xe tube, are disclosed as light sources. However, light sources formed by combining an LED light source and a lamp (tube light source) are not disclosed.

Japanese Patent Application Laid-Open Publication No. 2001-339577 discloses a technique to lessen the number of LEDs incorporated in an LED light source for use in an image reading apparatus without degrading the optical output characteristics.

Japanese Patent Application Laid-Open Publication No. 2000-32219 discloses a hybrid lighting system that includes a normal light source, such as an LED, of at least one color, and a light source of a high intensity, such as a blue cold-cathode fluorescent tube, with at least one color biased.

Similar technology is disclosed in Japanese Patent Application Laid-Open Publication Nos. 11-098331 and 9-330001.

However, to satisfy a characteristic value typically in optimum spectral characteristics and illuminance distribution required for the scanner by using a cold-cathode tube alone, the material of a fluorescent lamp or a tube glass has to be carefully selected, thereby making it difficult to easily change the characteristic value.

On the other hand, for an LED light source, changing the characteristics is relatively easy because the LED light source is a collection of point sources of light. Therefore, the LED light source can be lit up at a speed higher than that of the cold-cathode tube. However, there is a problem in obtaining a sufficient amount of light. There is also a problem in obtaining smooth illuminance distribution.

Moreover, one of the characteristics of the cold-cathode tube light source is a startup-in-the-dark characteristic, in which a tube left in the dark takes time to perform an electron exciting process upon reception of a lighting signal and, as a result, takes time to be lit up. Conventionally, LEDs are disposed singly on the cold-cathode tube side for lighting up the tube waiting in the dark, thereby reducing a lighting startup time.

Furthermore, of the cold-cathode tube light source and the LED light source, the LED light source, which is a semiconductor light source, is generally well known to take a shorter time to emit light with the same lighting start timing.

SUMMARY OF THE INVENTION

It is an object of the present invention to solve at least the problems in the conventional technology.

An image forming apparatus according to an aspect of the present invention includes a light source that is a combination of a cold-cathode tube having three waveforms and LEDs in an array.

An image scanning method according to an aspect of the present invention is executed on an apparatus that includes a light source that is a combination of a cold-cathode tube having three waveforms and LEDs in an array. The image scanning method includes lighting up the cold-cathode tube and the LEDs at different timings when reading a document.

The other objects, features, and advantages of the present invention are specifically set forth in or will become apparent from the following detailed description of the invention when read in conjunction with the accompanying drawings.

DETAILED DESCRIPTION

Exemplary embodiments of an image forming apparatus and an image scanning process according to the present invention are explained below with reference to the accompanying drawings. For the sake of the explanation, it is assumed here that the image forming apparatus is a scanner apparatus.

Figure 1:
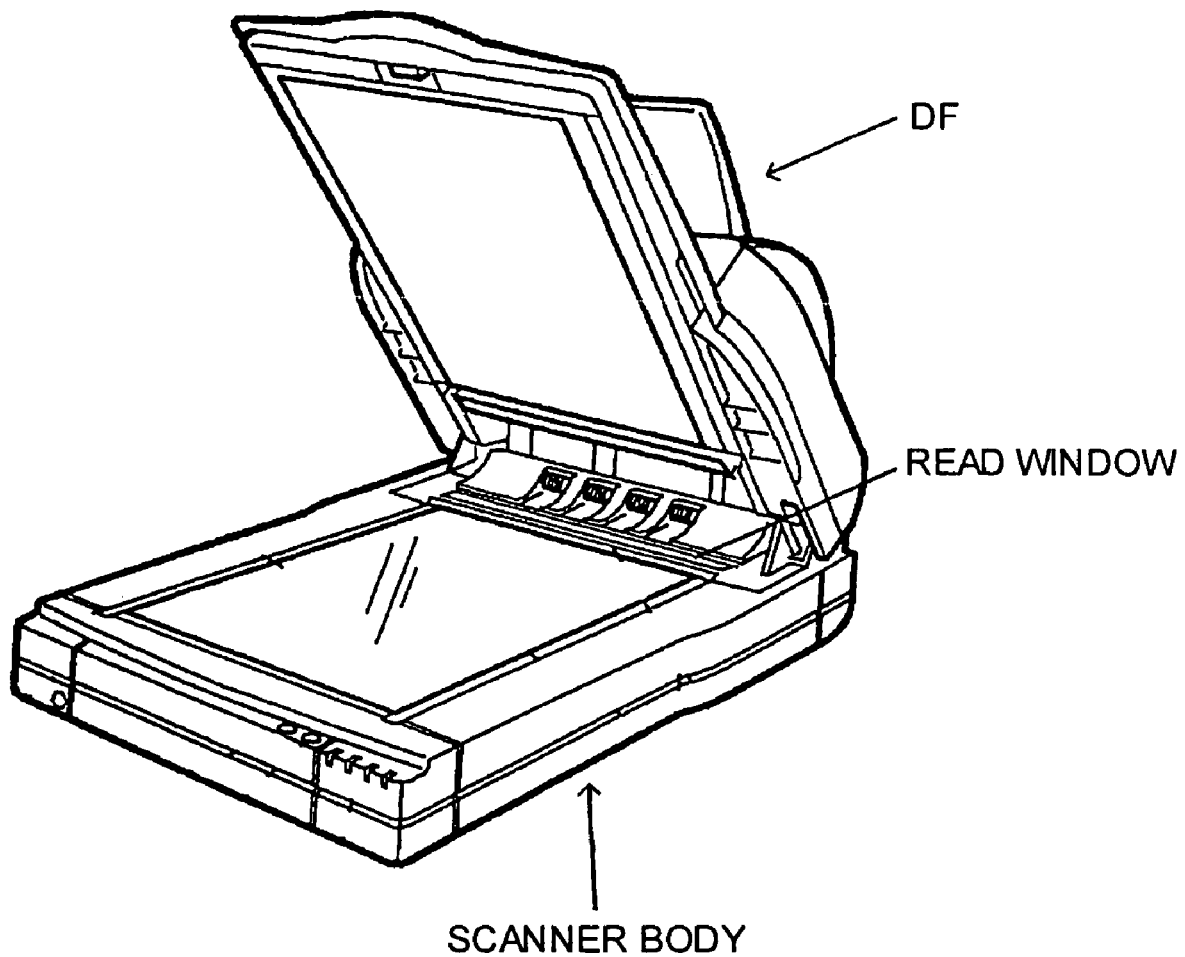
FIG. 1 is an external view of an image forming apparatus according to an embodiment of the present invention.

FIG. 1 is an external view of the image forming apparatus according to an embodiment of the present invention.

The body of such a scanner apparatus includes a housing, a document plate (glass), a first running body (first carriage), a second running body (second carriage), a driving motor, a lens block, a CCD substrate, and a reference white plate. Furthermore, when a plurality of document sheets are to be successively read, a sheet-through automatic document feeder (ADF) can be mounted. Hereinafter, the scanner apparatus mentioned above is exemplarily described, and this scanner apparatus can also be applied to a digital copying machine.

The first running body used in such a scanner apparatus includes a light source for applying light to a document and a mirror for transmitting reflected light to the second running body. The light emitted from the light source is applied to the document, and its reflected light is guided via the mirror of the first running body to a mirror of the second running body, a light-gathering lens of the lens block and then the CCD substrate, and is then converted to an electrical signal.

To read the document on the document plate, the running bodies are moved by the driving motor in a sub-scanning direction with respect to the document fixed onto the document plate (contact glass), thereby scanning the document.

Also, to successively read a plurality of document sheets by using the sheet-through ADF, the running bodies are fixed, and the document to be read are moved for scanning.

Figure 2:
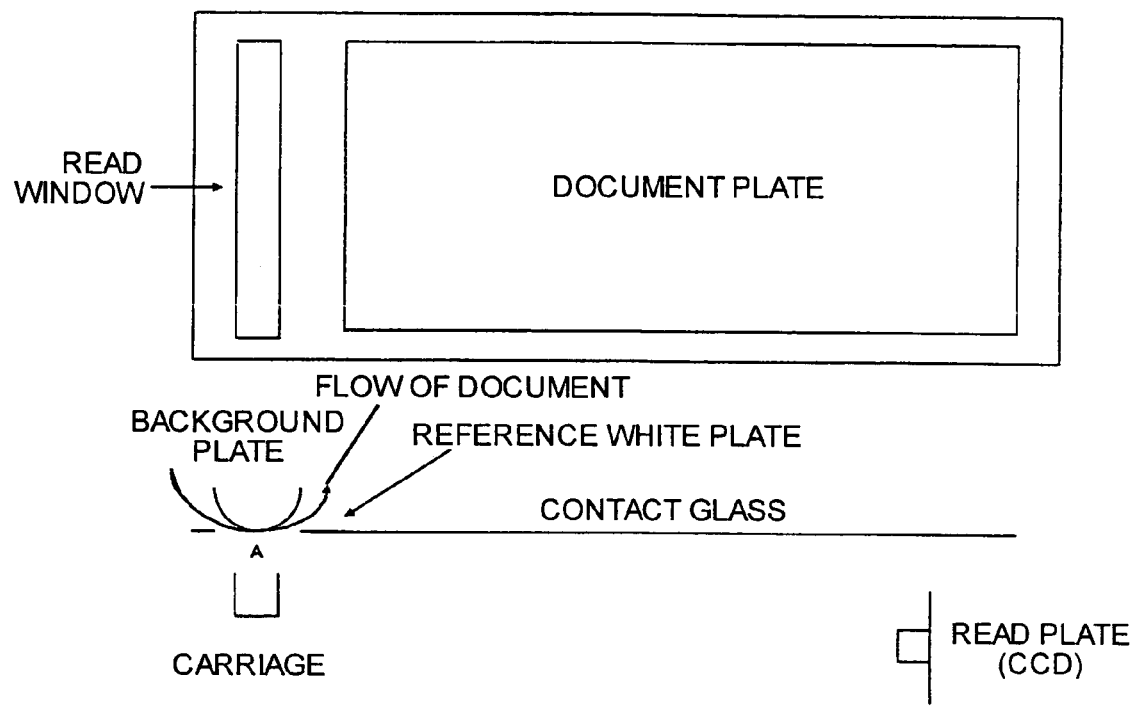
FIG. 2 is schematic for explaining the principle of document reading according to the image forming apparatus shown in FIG. 1.
Figure 2:
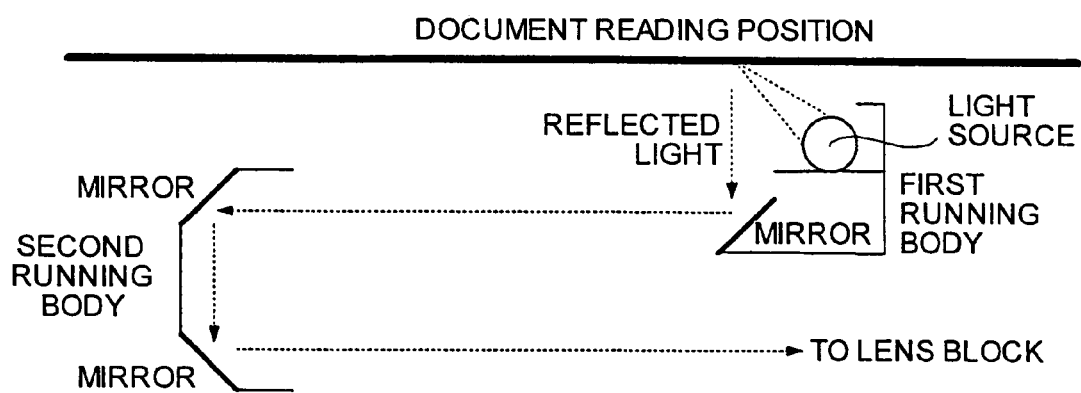

As shown in FIG. 2, the first running body is fixed under a slit-like opening commonly called "window", over which the document passes.

Such an image forming apparatus has conventionally used a fluorescent lamp, a halogen lamp, or the like as the light source of the scanner apparatus. However, in recent years, the apparatus uses a cold-cathode tube with relatively long life and high stability as the light source.

Such a cold-cathode tube had a drawback in which illuminance is low compared with that of the conventional light source. However, in recent years, the cold-cathode tube has been made capable of high output, and has been used for color scanners.

On the other hand, image forming apparatuses using LEDs, which are semiconductor elements, as a light source have emerged and become commercially available, but they have some drawbacks.

One is that the illuminance is extremely low. Particularly, the illuminance of the LED light source is yet lower even compared with that of the cold-cathode tube. The LED light source is bottlenecked on this drawback in achieving a high reading speed.

Furthermore, each of the LEDs aligned in a main-scanning direction forms a point source of light or a component extremely similar to a point of source of light. Therefore, a drop (discontinuity) in illuminance occurs in a gap between the LEDs. As a result, obtaining smooth illuminance distribution is difficult.

The image forming apparatus according to the present invention solves the problems in the conventional art by complementing the light sources with each other in their drawbacks, thereby resultantly obtaining scan data with high image quality. Light sources according to the present invention are a cold-cathode tube light source and an LED light source in an array which individually emit light having wavelengths of primary colors (R: red, G: green, and B: blue).

Figure 3:
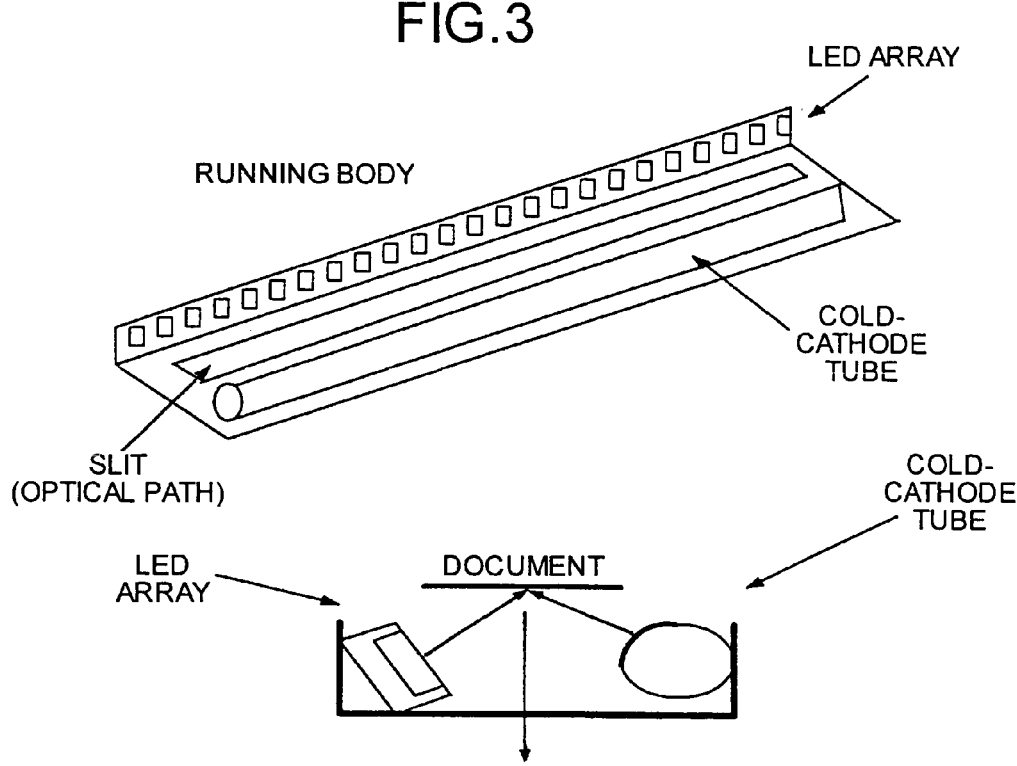
FIG. 3 is another schematic for explaining the principle of document reading according to the image forming apparatus shown in FIG. 1.
Figure 3:
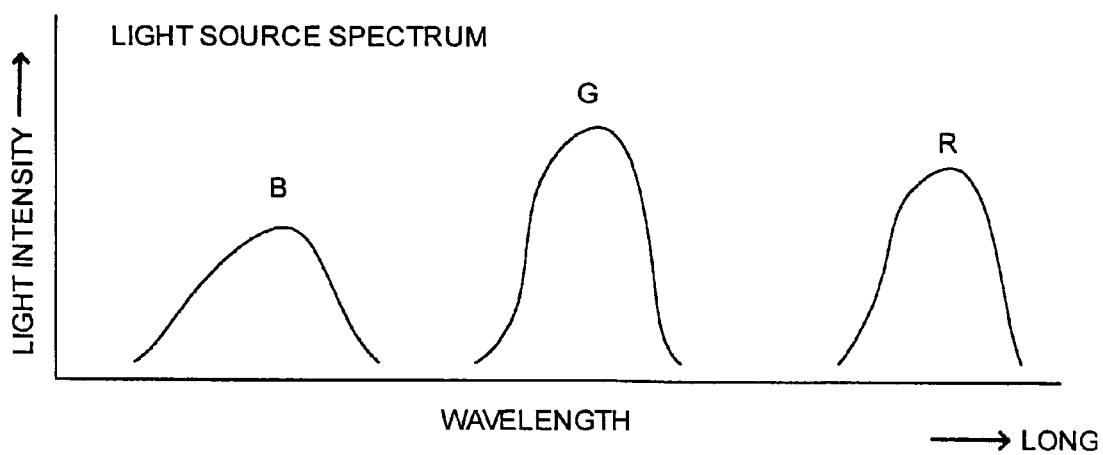

FIG. 3 is a diagram of an exemplary structure of the image forming apparatus according to the present invention. The cold-cathode tube light source is disposed on the running body, and has an opening portion for light obliquely provided.

On the other hand, the LED light source is mounted to be obliquely opposed to the cold-cathode tube light source, and applies oblique light to the document on the contact glass.

The light applied to the document passes, as reflected light, between the cold-cathode tube light source and the LED light source to be guided to the mirror of the first running body.

The mirror image falling onto the mirror of the first running body is repeatedly reflected by the mirror of the second running body, and is then guided to the lens of the lens block.

In the conventional technology, a plurality of cold-cathode tube light sources may be disposed to obtain larger illumination. In this case, however, when two cold-cathode tubes are used, for example, their energy consumption, occupied area, weights over the running body, and the like are doubled compared with the case where one cold-cathode tube is used. To get around this, according to the present embodiment, the cold-cathode tube is combined with the LED light source for use. The following are features of the cold-cathode tube and the LED light source.

| LED light source | Cold-cathode light source |
| --- | --- |
| Light weigh | Heavy (glass) |
| Low consumption (Low voltage) | High consumption (High voltage driving → large noise) |
| Can be downsized (higher flexibility in layout) | Lower flexibility in layout |
| Extremely long life | Normal life period |
| Short lighting startup time | Long lighting startup time due to startup-in-the-dark |
| Low illuminance | High illuminance |
| Large dispersion in illuminance | Smooth distribution in illuminance |

As described above, by combining of the LED light source and the cold-cathode tube, a more appropriate optical system can be designed so that these light sources are complemented with each other in their drawbacks. Therefore, a load on the optical system can be reduced compared with the structure including two cold-cathode tubes.

Advantageous features of the cold-cathode tube light source that have been conventionally known are long life, high stability, and a low amount of heat, compared with the halogen light source or the fluorescent lamp.

However, one of disadvantageous features is a relatively long lighting startup time, which is particularly called as a startup-in-the-dark characteristic representing a phenomenon in which the lighting startup time is extremely long when the cold-cathode tube light source is left in the dark for a long time. Another disadvantageous feature is that suppressing dispersion in luminous intensity is difficult.

To get around these disadvantages, some scheme have to be adopted, such that a large margin is provided in advance to the actual scanning start timing to set a lighting start signal in an ON state, or that the LEDs are always lit up solely to keep the cold-cathode tube in an excitation state with light-emitting energy, thereby reducing the startup time.

According to the present invention, the LED light source is started to be lit up earlier than the cold-cathode tube light source, thereby similarly reducing a startup time.

A difference from the conventional technology is described below. That is, in the conventional technology, the LEDs are used not as a light source but as an exciting unit, and are always lit up while waiting. A feature of the present invention is that the LEDs are used as a light source that is not lit up while waiting, and only its lighting start time is controlled in advance.

Figure 4:
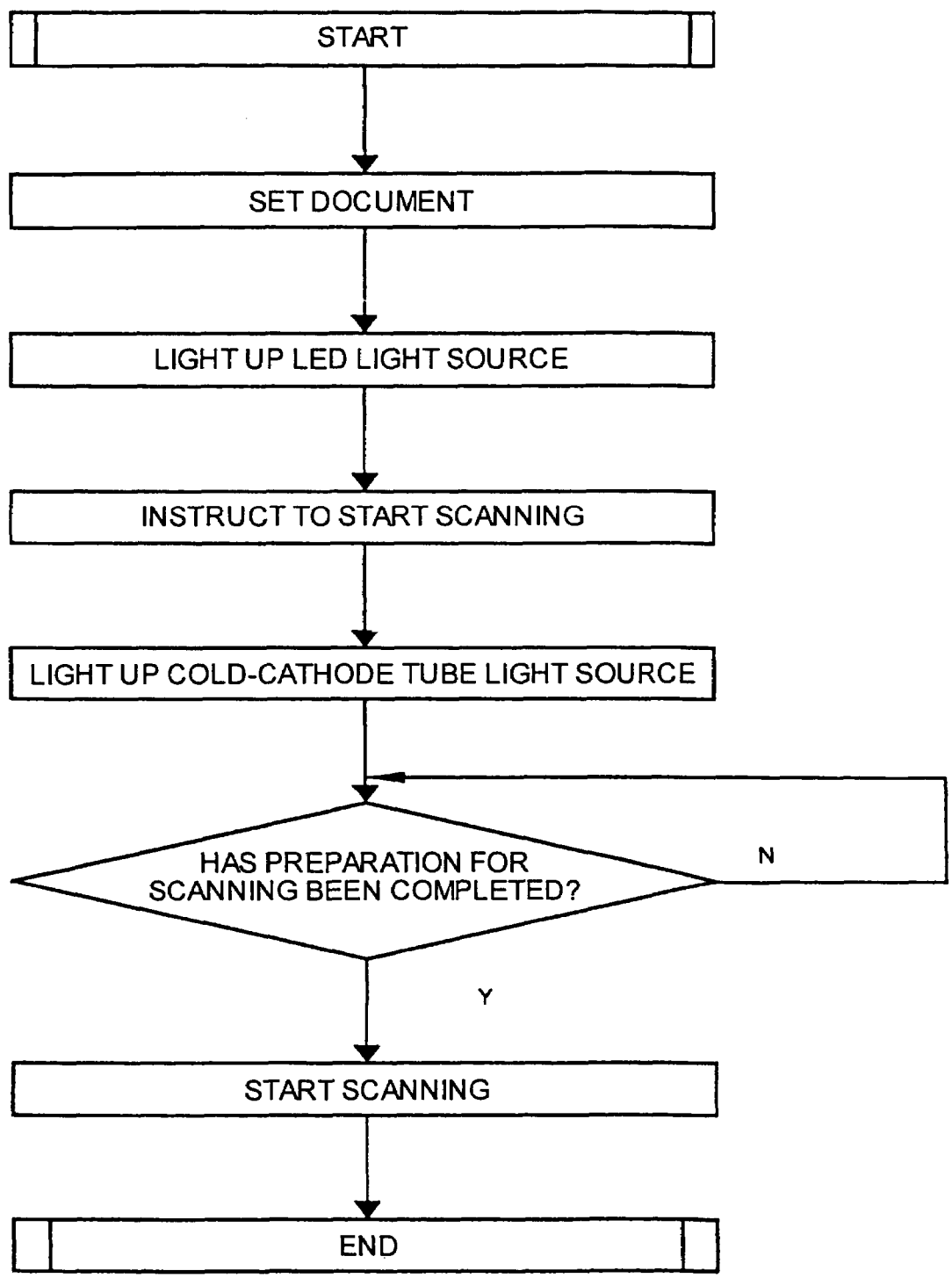
FIG. 4 is a flowchart of an image scanning process performed by the image forming apparatus shown in FIG. 1.

A flow of the processes performed by the image forming apparatus until the start of scanning is shown in FIG. 4.

As described above, the timing of lighting up the LED light source is made early to advance the startup of the cold-cathode tube light source. By doing this, an early startup time of lighting up the cold-cathode tube light source and reduction in deviations in startup time can be expected.

However, a difference in the manner of startup between the light sources may cause unevenness in illumination. Therefore, this may cause inconvenience when a maximum illumination is used for gain correction, for example.

According to the present invention, the timing of lighting up the LED light source is delayed from the timing of lighting up the cold-cathode tube light source, thereby coinciding the timing of reaching the maximum illumination of the LED light source with that of the cold-cathode tube light source.

Figure 5:
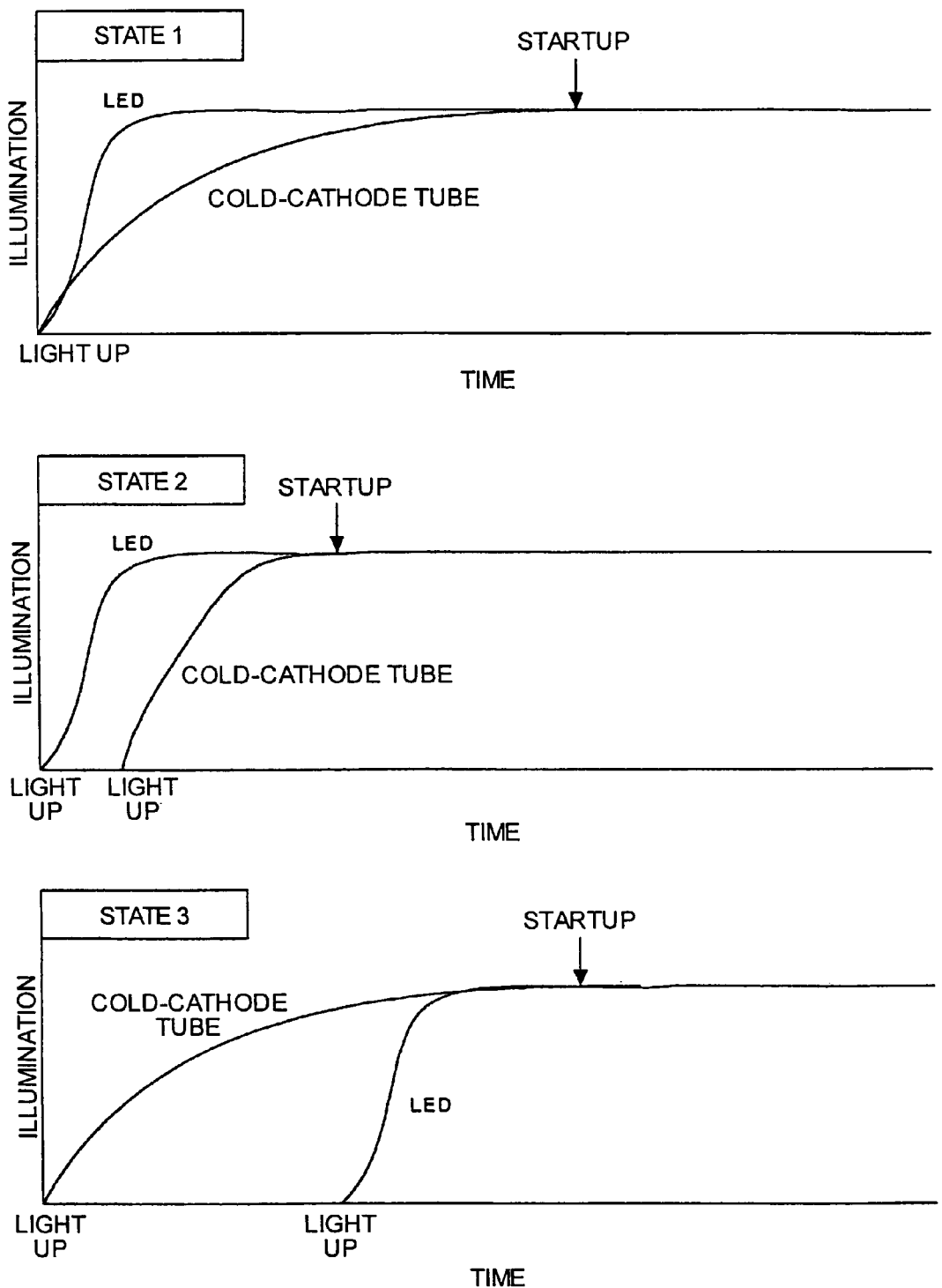
FIG. 5 is a diagram of examples of startup when the light sources are lit up.

An example of startup of lighting up the light sources is shown in FIG. 5.

In state 1, that is, when the light source that is a combination of a cold-cathode tube having three waveforms and LEDs in an array, the light sources can be complemented with each other in demerits of light source characteristics, and high image quality in the reading apparatus can be achieved more easily.

In state 2, that is, when the LEDs are lit up before the cold-cathode tube, a long lighting startup time, which is a drawback to the cold-cathode tube, can be shortened, thereby reducing a time taken until the start of scanning a document. This leads to reduction in adjusting time and effective use of time for detailing or the like.

In state 3, that is, when the cold-cathode tube is lit up before the LEDs, the difference in startup time between the LED light source and the cold-cathode tube light source can be absorbed, thereby achieving document scanning simultaneously upon startup.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:
a light source that is a combination of a cold-cathode tube having three waveforms and LEDs in an array,
wherein when reading a document, controlling is performed such that the LEDs are lit up before the cold-cathode tube, and both the LEDs and cold cathode tube are subsequently lit.

2. An image forming apparatus comprising:
a light source that is a combination of a cold-cathode tube having three waveforms and LEDs in an array,
wherein when reading a document, controlling is performed such that the LEDs are lit up before the cold-cathode tube, and at a time sufficiently before the cold-cathode tube that the LEDs function as an exciting unit for the cold cathode tube, and both the LEDs and cold cathode tube are subsequently lit.

3. An image forming apparatus comprising:
a light source that is a combination of a cold-cathode tube having three waveforms and LEDs in an array,
means for controlling the cold-cathode tube and LED's when reading a document such that the LEDs are lit up before the cold-cathode tube, and at a time sufficiently before the cold-cathode tube that the LEDs function as an exciting unit for the cold cathode tube, and both the LEDs and cold cathode tube are subsequently lit.

* * * * *